United States Patent [19]

Anderson et al.

[11] 4,182,102
[45] Jan. 8, 1980

[54] CROP PICKUP ASSEMBLY

[75] Inventors: John D. Anderson, Canton; Adin F. Holdeman, Hesston; Dwight C. Moddelmog, Canton, all of Kans.

[73] Assignee: Hesston Corporation, Hesston, Kans.

[21] Appl. No.: 837,506

[22] Filed: Sep. 29, 1977

[51] Int. Cl.$^2$ ............................................. A01D 89/00
[52] U.S. Cl. ...................................... 56/344; 56/13.2; 56/364
[58] Field of Search ................................. 56/344–364, 56/13.1, 13.2; 214/518, 519; 100/250

[56] References Cited

U.S. PATENT DOCUMENTS

| 3,021,661 | 2/1962 | Couberly | 56/364 |
| 3,126,693 | 3/1964 | Renn | 56/364 |
| 3,221,483 | 12/1965 | Ronning | 56/364 X |
| 3,233,394 | 2/1966 | Lundell | 56/1 |
| 3,779,158 | 12/1973 | Adee et al. | 100/250 |
| 3,782,086 | 1/1974 | Anderson | 56/344 |
| 3,898,786 | 8/1975 | Lundahl | 56/344 |

FOREIGN PATENT DOCUMENTS

| 264893 | 9/1968 | Austria | 56/344 |
| 1198111 | 8/1965 | Fed. Rep. of Germany | 56/344 |

*Primary Examiner*—Russel R. Kinsey
*Attorney, Agent, or Firm*—Schmidt, Johnson, Hovey & Williams

[57] ABSTRACT

The pickup assembly has an upright loading duct with a primary conveying impeller located between the upper outlet and the lower inlet of the duct. A secondary crop pickup impeller adjacent the inlet combs through crop stubble as the machine advances and lifts severed crop materials up to the primary impeller where the latter propels the materials upwardly through the duct and out the outlet. Flexible rubber fingers on the secondary impeller are generally T-shaped, having heads that are releasably clamped against the hub of the impeller by an inverted channel which is capable of retaining a series of the fingers at the same time. The secondary impeller floats independently of the duct and has one or more gauge wheels associated therewith to keep the fingers of the impeller from digging into the ground during rotation.

9 Claims, 6 Drawing Figures

CROP PICKUP ASSEMBLY

This invention relates to equipment for picking up severed crop material from the ground as the latter is traversed and propelling such material upwardly through a loading duct for delivery into an associated mobile receptacle. The principles of the present invention are thus ideally suited for use in connection with stack-forming machines of the type illustrated in U.S. Pat. No. 3,779,158.

The pickup rotors or impellers utilized in machines according to the foregoing patent work on a combined principle of blowing and physical impact. Generally speaking, it is first necessary for the paddles of such rotors to engage the crop materials lying on the ground and physically lift them up into the loading duct. During such lifting action, the high speed of rotation of the rotor necessarily imparts a certain amount of momentum to the crop materials so as to, in effect, fling the same upwardly through the duct, but also the crop materials are entrained within an airstream that is generated by the rotor.

In some situations it has been found that this technique is not entirely satisfactory. For example, if the crop materials are wet and matted down instead of being loose and fluffy, then it is sometimes difficult to lower the rotor far enough to successfully remove all of the materials from the ground. Furthermore, if the severed crop materials have been left in the field for more than a minimum length of time, it is likely that, depending upon the crop involved, the stubble will begin to grow again, sending up "regrowth" that may be inadvertently severed by the pickup rotor and collected in the receptacle along with the intentionally picked up materials. The moisture content of such regrowth could be high enough to spoil any stack or other "package" of hay subsequently formed from the collected materials, thus wasting the entire volume of harvested crop.

Accordingly, it is one important object of the present invention to overcome these and other shortcomings through the provision of a secondary pickup impeller whose function it is to comb gently through the crop stubble at a lower level than that obtainable by the primary impeller in the duct and to then feed the picked up material sufficiently into the duct that it can be acted upon by the primary impeller and conveyed in the usual way from that point on.

Another important object of this invention is to mount the secondary pickup impeller in such a way that it can float according to ground contour independently of the duct.

An additional important object of this invention is to provide a special way of attaching the combing fingers of the secondary impeller so that they can be quickly removed and replaced in the event of damage or untoward wear.

Yet another important object of this invention is to design the combing fingers in such a way that while they will quite effectively engage and lift loose crop materials into the duct, they will have no tendency to mow the stubble or regrowth that may be associated therewith.

A still further important object of this invention is to provide the combing fingers of such design that they are sufficiently rigid to impel the picked up crop upwardly into the duct yet are sufficiently resilient to yield when stones and other like obstructions are encountered.

RELATED PRIOR ART

Adee, et al, U.S. Pat. No. 3,779,158; Denzin, U.S. Pat. No. 3,747,313; and Lundahl, U.S. Pat. No. 3,898,786.

Figure 1:
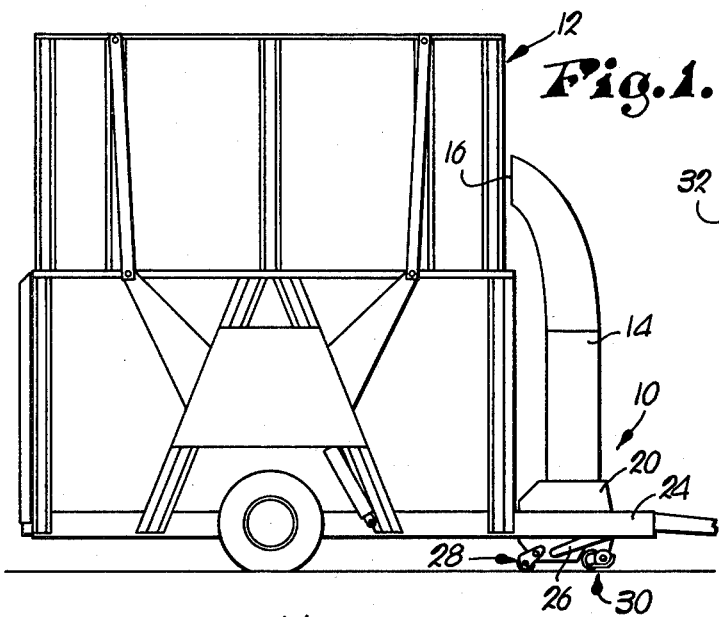
FIG. 1 is a side elevational view of a stack-forming machine utilizing a pickup assembly in accordance with the principles of the present invention.
Figure 6:
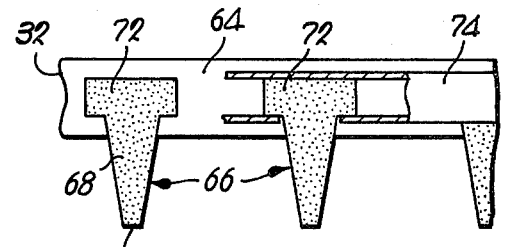
FIG. 6 is an enlarged, fragmentary detail view with portions in section of the manner in which the combing fingers are mounted on the secondary impeller.
Figure 2:
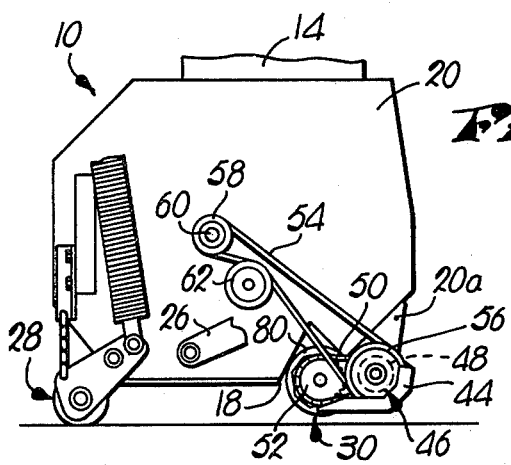
FIG. 2 is an enlarged, fragmentary side elevational view of said assembly.

The pickup assembly 10 is illustrated in FIG. 1 in conjunction with a mobile receptacle 12 in the nature of a stack-forming wagon of the type described and claimed in the aforementioned Adee, et al patent, U.S. Pat. No. 3,779,158. Details of construction of the receptacle 12 and its manner of operation are of on consequence to the principles of the instant invention, and will therefore not be described; reference may be had to said U.S. Pat. No. 3,779,158 if need be for further information on the nature of such a machine.

The assembly 10 comprises an upright duct 14 having a crop outlet 16 at its upper end and a crop inlet 18 at its lower end. Generally adjacent the inlet 18, the duct 14 is enlarged so as to present a housing 20 containing a primary impeller 22. The primary impeller 22 is normally rotated in a counterclockwise direction viewing FIG. 3 by mechanism not shown and is operable to propel a stream of crop materials upwardly through the duct 14 and out the outlet 16 into the trailing receptacle 12. The duct 14 is supported on the chassis 24 by means of a pair of parallel links 26 on opposite sides thereof (only one being shown), and further by means of a spring-loaded gauge roller 28, details of which are described and claimed in U.S. Pat. No. 3,782,086.

A secondary impeller 30 is provided adjacent the inlet 18 and below the primary impeller 22 for the purpose of picking up loose crop material from the ground and delivering the same up to the primary impeller 22 for conveyance by the latter through the duct 14. The secondary impeller 30 is in the nature of a rotor having a hub 32 in the form of a square tube that extends across the full width of the inlet 18 slightly below and fowardly of the latter. Stub shafts 34 (only one being shown) at opposite ends of the hub 32 are coaxially fixed to the latter and are journaled by bearings 36 in the rear ends of a pair of lift arms 38. The arms 38 in turn are pivotally supported at their respective forward ends by horizontal pintles 40 projecting inwardly from downward extensions 20a of the housing 20. The secondary impeller 30 is thereby adapted for vertical swinging movement about the common axis of the pintles 40. Lower limit stops 42 fixed to the lowermost ends of the extensions 20a determine the lowermost extent of swinging movement of the secondary impeller 30. Skids 44 are also attached to the lower ends of the extensions 20a and project forwardly of the pintles 40.

Figure 5:
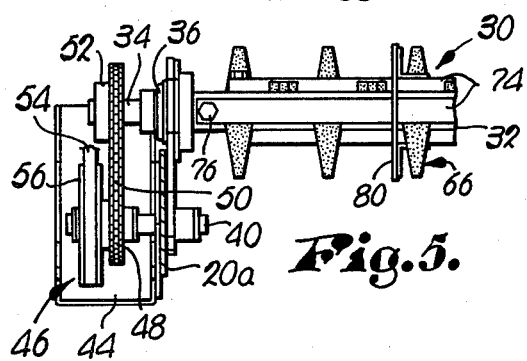
FIG. 5 is a fragmentary horizontal cross-sectional view of the assembly looking downwardly on the secondary impeller and its associated drive mechanism.
Figure 4:
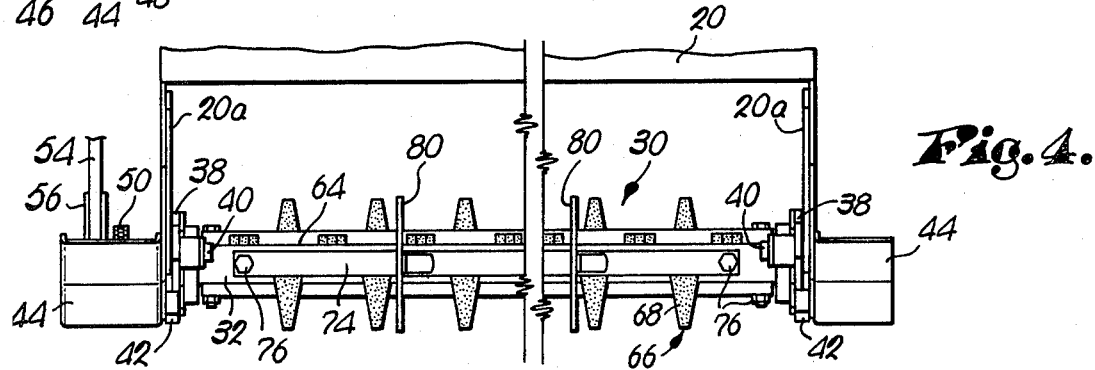
FIG. 4 is a fragmentary front elevational view thereof.

The left pintle 40 (viewing FIGS. 4 and 5) projects outwardly beyond the proximal extension 20a and rotatably supports a composite sheave and sprocket unit 46. The sprocket 48 of unit 46 is entrained by a drive chain 50 that also entrains a second sprocket 52 fixed to the corresponding stub shaft 34 of the secondary impeller 30, thereby to transmit driving power from the sheave/sprocket unit 46 to the secondary impeller 30. The unit 46 in turn receives its input power through a belt 54 around the sheave 56 of the unit 46, the belt 54 being also trained around a sheave 58 fixed to the shaft 60 of the primary impeller 22. An idler 62 engages the slack side of the belt 54.

The secondary impeller 30, because of the polygonal nature of the hub 32 thereof, has a plurality of flat peripheral surfaces 64 extending the entire length of the tube 32. Fingers 66 of the secondary impeller 30 are spaced apart along each of such surfaces 64 and lie flatly against the same while projecting a distance laterally therebeyond so as to extend in a generally tangential relationship with respect to the circular path of travel of the secondary impeller 30. Each of the fingers 66 is generally T-shaped, having a body 68 tapering outwardly to a generally pointed tip 70, and a transversely extending head 72 remote from the tip 70. The head 72 is of generally rectangular configuration, while the body 68 is basically triangular, save for the fact that the tip 70 is squared off rather than pointed.

As a result of the rectangular configuration of the head 72, the same may advantageously be used to anchor the fingers 66 along the surfaces 64. In this regard, an inverted, generally U-shaped channel 74 receives the heads 72 in axial alignment along each of the surfaces 64 respectively, the channel 74 in turn being releasably fastened to the tube 30 by a pair of screws 76 or the like at opposite ends thereof. A series of notches 78 along the channel 74 at the interface between the latter and the proximal surface 64 provide clearance for the forwardly projecting bodies 68 of the fingers 66.

Preferably, the fingers 66 are constructed from a material that will allow the same to flex yieldably when encountering stones and other obstructions during high speed spinning of the secondary impeller 30. One suitable material has been found to be a rubber and fabric composition found in tire carcasses. A pair of gauge wheels 80 are fixed to the tube 32 at spaced locations along the latter and in concentric relationship therewith for engaging the ground before substantial engagement thereof by the fingers 66 so as to prevent untoward stress thereon, notwithstanding their resilient nature. Preferably, the wheels 80 project radially outwardly from the axis of rotation of the secondary impeller 30 a distance that closely approximates the distance of the tips 70 of fingers 66 from such axis.

OPERATION

It is suggested that the pickup assembly 10 may be run in the field with the duct 14 so positioned that the primary impeller 22 is spaced substantially above the ground. Thus, appropriate adjustment of the gauge roller 28 may be effected so that the primary impeller 22 is spaced sufficiently above the ground that it does not make actual contact with the latter or with the loose materials lying thereon. Rather, all of such initial contact is made by the secondary pickup impeller 30 which, by virtue of the driving arrangement from the primary impeller 22, rotates in a counterclockwise direction viewing FIG. 3.

As the assembly 10 is advanced across the field, the fingers 66 of the spinning secondary impeller 30 comb through the upstanding stubble and engage the severed, loose materials lying thereon. Thus, the fingers 66 lift such material upwardly into the inlet 18 and sufficiently far into the housing 20 as to be swept up by the primary impeller 22 and hurled upwardly through the duct 14. The gentle but very thorough combing action of the secondary impeller 30 is therefore utilized to merely dislodge the loose materials and to introduce them into the duct 14, whereupon the more aggressive and powerful action of the primary impeller 22 takes over to provide the motive force necessary to project the materials through the duct 14 and into the trailing receptcle 12.

This conjoint action has been found to be extremely effective in a variety of otherwise difficult-to-handle situations such as, for example, where the crop materials are damp and matted down into the stubble. Moreover, the fact that the fingers 66 merely comb through the stubble rather than slashing through it as would a mower or paddle blade means that any regrowth of the stubble is spared and that only the loose, previously severed materials are lifted from the ground.

Figure 3:
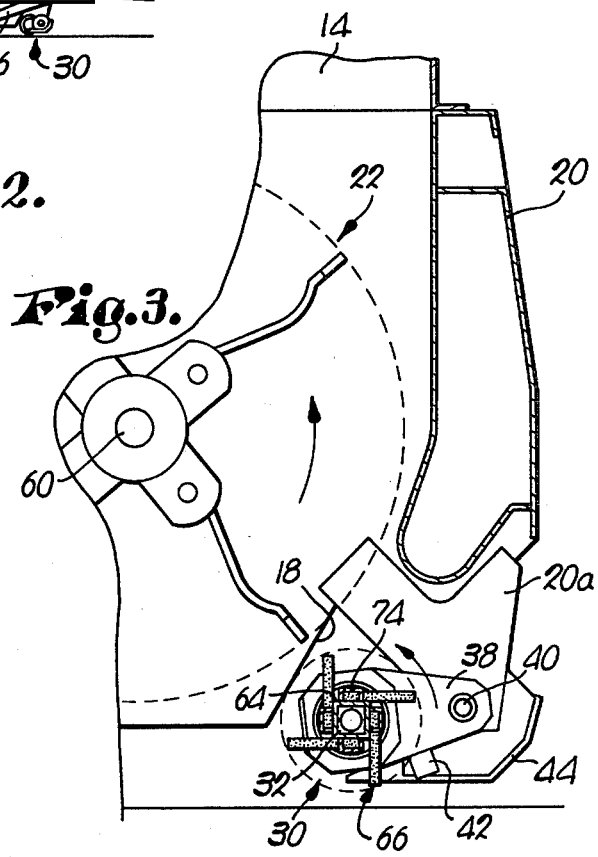
FIG. 3 is a further enlarged, fragmentary vertical cross-sectional view through the assembly.

Changes in ground contour are sensed by the gauge wheels 80 so that the secondary impeller 30 may rise and fall about its horizontal pintles 40 as may be necessary in order to accommodate such changes. This freedom to float independently of the duct 14 is especially significant when it is remembered that the gauge roller 28 for the duct 14 is located at the rear of the latter and thus comes too late to be of any significant benefit to the secondary impeller 30 in overcoming obstacles. As is apparent, the secondary impeller 30 is gravity-biased toward the stops 42 and cannot swing lower than the distance permitted by such stops 42 as illustrated in FIG. 3. Stops 42 thus provide an excellent support for the secondary impeller 30 in the event that the duct 14 should be substantially raised off the ground by means not illustrated for purposes of transport.

Having thus described the invention, what is claimed as new and desired to be secured by Letters Patent is:

1. A crop pickup assembly for use in loading a mobile receptacle, said assembly comprising:
   a generally upright duct having an opn bottom and a crop outlet at the upper end thereof;
   a primary conveying rotor disposed entirely within said duct immediately above said open bottom for drawing a stream of air upwardly through said open bottom and propelling the same with crop materials upwardly through the duct and into the receptacle; and
   a secondary pickup rotor situated generally below said primary rotor in position to lift crop materials off the ground and feed the same up through said open bottom to said primary rotor for said propulsion thereby.

2. An assembly as claimed in claim 1; and means mounting said secondary rotor for vertical swinging movement independently of said duct.

3. An assembly as claimed in claim 2, wherein said secondary rotor is provided with means for limiting the extent of downward swinging thereof.

4. An assembly as claimed in claim 3, wherein said secondary rotor is gravity-biased toward the lower limit of its swinging movement.

5. A crop pickup assembly for use in loading a mobile receptacle, said assembly comprising:

a generally upright duct having a crop inlet at the lower end thereof and a crop outlet at the upper end thereof;

a primary conveying impeller disposed within the duct between said inlet and outlet for propelling a stream of air and crop materials upwardly through the duct and into the receptacle; and a secondary pickup impeller adjacent said inlet for lifting crop materials upwardly through said inlet and feeding the same to said primary impeller for said propulsion thereby, said secondary impeller comprising a rotor having a plurality of flexible crop-engaging fingers projecting outwardly from a hub of the rotor, each of said fingers extending tangentially with respect to the circular path of travel of the rotor, each of said fingers having an elongated body and a transversely extending head at the inner end of the body, said head being retained at the hub.

6. An assembly as claimed in claim 5, wherein said hub is polygonal in transverse cross section presenting a series of flat sides, said rotor further including an inverted, transversely U-shaped channel receiving and releasably clamping the heads of a longitudinally spaced series of the fingers against a proximal one of said surfaces, said channel being notched adjacent the interface between the channel and the proximal surface to clear the bodies of the fingers.

7. A crop pickup assembly for use in loading a mobile receptacle, said assembly comprising:

a generally upright duct having a crop inlet at the lower end thereof and a crop outlet at the upper end thereof;

a primary conveying impeller disposed within the duct between said inlet and outlet for propelling a stream of air and crop materials upwardly through the duct and into the receptacle; and a secondary pickup impeller adjacent said inlet for lifting crop materials upwardly through said inlet and feeding the same to said primary impeller for said propulsion thereby, said secondary impeller comprising a rotor having a plurality of flexible crop-engaging fingers projecting outwardly from a hub of the rotor, said rotor being provided with a gauge wheel rotatable with the rotor about the axis of rotation of the latter, said wheel having a peripheral edge disposed at substantially the same distance from said axis of rotation as the tips of said fingers.

8. An assembly as claimed in claim 7, wherein said rotor is mounted for vertical swinging movement relative to said duct in response to changes in ground contour sensed by said gauge wheel.

9. An assembly as claimed in claim 1, wherein said secondary rotor is provided with a plurality of fingers, said fingers projecting outwardly and rearwardly with respect to the direction of rotation of the secondary rotor whereby to facilitate release of picked up crop material to said primary rotor.

* * * * *